July 5, 1938.  C. H. SCHURR  2,122,803

METHOD OF AND APPARATUS FOR FINISHING HELICAL SURFACES

Filed April 27, 1932

INVENTOR.
Charles H. Schurr
BY
Hawgood and Van Horn
ATTORNEYS

Patented July 5, 1938

2,122,803

UNITED STATES PATENT OFFICE 2,122,803

METHOD OF AND APPARATUS FOR FINISHING HELICAL SURFACES

Charles H. Schurr, Cleveland, Ohio, assignor to The Lees-Bradner Company, Cleveland, Ohio, a corporation of Ohio Application April 27, 1932, Serial No. 607,808

12 Claims. (Cl. 51—161)

This invention relates to a method of finishing helical surfaces such for instance as the surfaces of the teeth of helical gears.

In producing spur gears having involute teeth, a gear blank has been simultaneously translated and rotated, so that the motion of a tooth being operated upon is identical with what it would be if the blank were rolled, on its pitch circle without slippage, upon a plane surface, the blank being thus rolled past a flat-faced cutting tool, such as a grinding wheel. The rolling of the tooth upon the cutting surface develops a true involute curve. The position of the cutting surface, to properly generate this curve, must be in a plane coinciding with a face of a tooth of an imaginary rack with which the gear would mesh. When the tooth face of the imaginary rack meshes with the gear at a given pressure angle, the pitch circle upon which the blank rolls is that upon which it would roll in engagement with the rack. If the pressure angle be reduced to zero, obviously the pitch circle becomes the base circle of the gear.

Obviously, with the spur gear rolling upon a rack, the teeth of the rack are parallel to the axis of the gear and the tooth of the gear contacts the tooth of the rack along a straight line which is also parallel to its axis and extends from end to end of the teeth. If, however, a helical gear be considered in mesh with a rack, it will be obvious that the contact of any tooth of the gear with a tooth of the rack will no longer be parallel to its axis, but will be a line lying in a plane surface of the rack tooth, and inclined from root to crest.

If the helical gear be considered as meshing with a rack of considerable extent in all directions, it will be seen that it can be rolled upon the rack in a direction normal to the teeth of the rack without any slippage along these teeth in the direction of their edges and that having rotated through a given angular displacement, it will have traversed a given number of teeth of the rack.

It will also be seen that the gear may be rolled in a direction normal to its axis through the same angular displacement and will have traversed the same number of teeth, each tooth of the gear rolling upon a corresponding tooth of the rack in precisely the same manner, except that the tooth will have been slid slightly along the tooth of the rack. Similarly, the gear may be translated along its axis while rotating in mesh with the teeth of the rack, and again the same angular displacement will cause it to traverse the same number of teeth of the rack, rolling upon each in turn with some slippage along their surfaces.

It is, therefore, possible, by providing a tool having a flat surface lying in the plane of the side of one of the rack teeth, and by rolling the gear with any of the three motions above described over said surface, to generate upon the gear an accurate true involute helical tooth surface.

It is an object of the present invention to provide an improved method and mechanism to generatively produce involute helical tooth surfaces.

Other objects will hereinafter appear.

The invention will be better understood from the description of one practical embodiment thereof illustrated in the accompanying drawing, in which.

Figure 1:
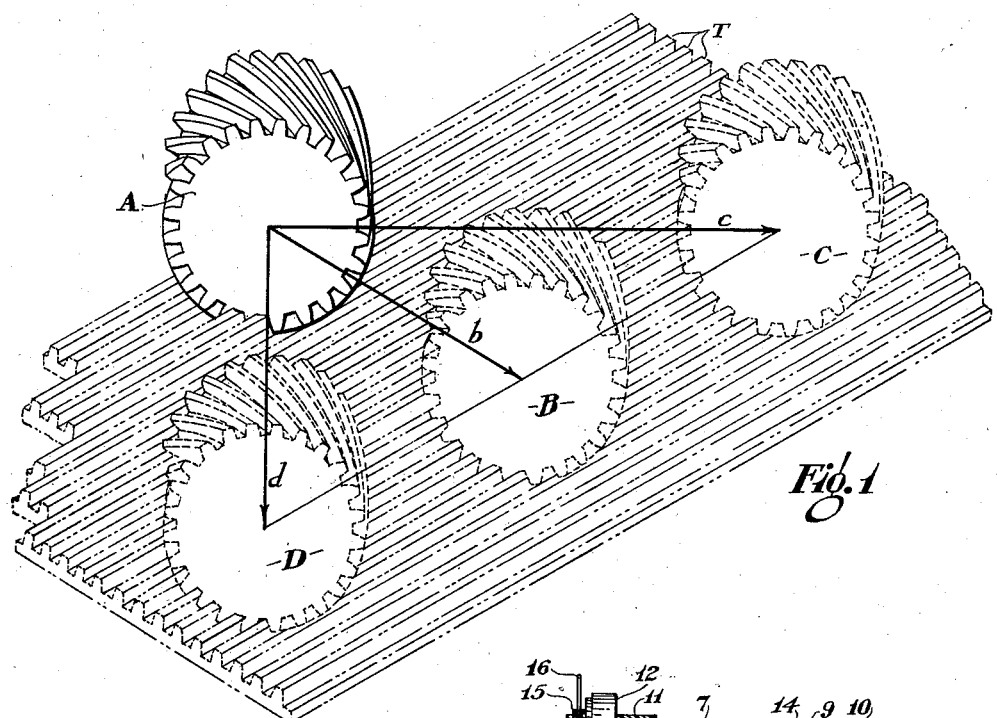
Figure 1 is a somewhat diagrammatic view of a work gear and an imaginary rack with which the finished gear to be produced would mesh.

In Figure 1 a series of rack teeth are indicated by dot-and-dash lines. At A is shown a work gear in the position which it would occupy at the beginning of a generative cutting operation. As stated above, the work gear A may roll along the teeth T of the rack without sliding thereon in a direction normal to the edges of these teeth, its center at the end shown in the drawing following the arrow b, so that the gear moves into the position illustrated at B and in so rolling the flat faces of the teeth T of the rack will generate upon the gear teeth true involute helical surfaces. If a cutting tool having a plane cutting surface is positioned with this surface coincident that of one of the rack teeth T, it will cut the tooth of the gear engaging it into the accurate involute helical profile desired.

If, however, the work gear is rolled from the position shown at A in a radial direction, it will travel along the arrow c to the position shown at C in which it will have traversed exactly the same number of teeth as in rolling along b, but will have moved along the teeth in the direction of their edges by the distance between positions B and C.

Considering now the third direction of motion above referred to, that is along the axis of the work gear, this gear may move along the arrow d to the position shown at D in which it will again have turned the same extent and traversed the same number of teeth as in moving along arrow b or c, but this time the teeth will have slid along the teeth of the rack an aggregate distance equal to that between positions D and B.

In each of the three cases described, the components of the motion of the blank are identical excepting the component in a line parallel to the plane of the cutting surface, so that in each case the identical tooth surface is developed.

The mechanism shown in the second and third figures of the drawings is used to move the gear axially, as from positions A to D, past a plurality of plane surfaces corresponding to the side surfaces of rack teeth T, and to so generate involute surfaces on the teeth. The tool shown is a rack-shaped lap, but obviously might be any other type of tool provided with cutting edges lying in the planes of the rack teeth.

The mechanism shown consists of a base 1 on top of which are ways 2. Slidable upon these ways is a carriage 3 which may be reciprocated along the ways by means of a lever 4, actuated by a crank 5, which is rotated by an electric motor 6, the lever being pivoted at its lower end within the base and having a slidable pivotal connection with the underside of carriage 3.

Upon the upper surface of the carriage are bearings 7 and 8 by which are supported an arbor 9, to which may be secured the work gear 10. One end of the arbor is provided with a cylindrical portion or drum 11 having one or more helical grooves or lands formed on its exterior, and these in turn are threaded through complementary lands or grooves formed in a bearing 12 fixed upon the top of the base, so that, as the carriage is reciprocated, the spindle and work gear will be rotated. The lead of the grooves or lands of drum member 11 must be the same as that of the work gear, but obviously the diameters need not be the same.

Attached to the base and shown as carried by two upwardly extending brackets 13 is a lap 14 having the shape of a wide and long rack. It is so adjusted that the flat side surfaces of its teeth are in a position to mesh with the teeth of the work gear, so that when the slide is reciprocated the teeth of the work gear will be cut by abrasive applied to the surfaces of the lap and thus generate true involute helical tooth surfaces. Such surfaces may, for convenience, be referred to as "helico-involute" surfaces.

Figure 2:
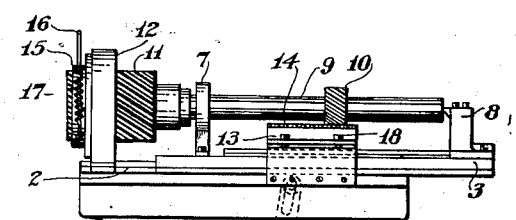
Figure 2 is a front elevation of a machine for lapping helical tooth surfaces.
Figure 3:
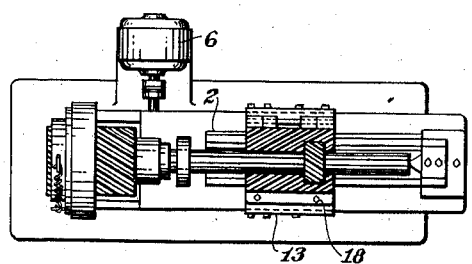
Figure 3 is a plan view of the machine of Figure 2.

A ring 15 is carried adjacent bearing 12 and is provided with an internal groove or grooves to receive the lands on drum 11. This ring serves a dual function; when the carriage is moved to the extreme left from the position shown in Figure 2, the lands of part 11 have passed beyond bearing 12, and the operator can rotate ring 15 by means of a handle 16 by a distance equal to one or more teeth, thus indexing the work gear. When the carriage is returned to the right, fresh surfaces will be operated upon by the lap teeth.

A spring 17 connects handle 16 to bearing 12, and, while the drum is engaging both bearing and ring, holds the lands of drum 11 tightly against one side of the grooves in bearing 12, taking up any slack which may exist between these two, and greatly improving the accuracy of the work produced.

Obviously, if the rack 14 is sufficient in extent and the travel of the carriage long enough, each of the teeth of the work gear may be brought into contact with those of the lap during a single reciprocation, so that indexing will be unnecessary. For this purpose, it is necessary that the lap have at least as many teeth as the gear, and that the gear travel far enough to more than make one complete revolution, so that each tooth will be lapped for its entire length.

With the drum 11 and bearing 12, the rotation of the gear is controlled at all times, so that not only accurate surfaces upon, but accurate spacing of, the teeth are produced.

If, however, the teeth of the work gear are sufficiently accurately cut as to spacing and the like, and it is only desired to finish the surfaces a little more accurately, the drum and its bearing can be dispensed with, and the gear supported to rotate freely between bearings 7 and 8, its rotation being wholly due to its motion along the teeth of the lap.

It is also obvious that it may be desirable to provide means for adjusting the lap toward and from the gear, or for resiliently pressing the lap against the gear. An adjusting screw for this purpose is shown at 18 but obviously a spring might replace this screw and the motion of the lap be limited by an adjustable stop, and that one only or both sides may be provided with adjustable means.

This application is, in part, a continuation of my copending application Serial Number 559,722, filed August 27, 1931.

While I have described the illustrated embodiment of my invention in some particularity, obviously many others will readily occur to those skilled in this art, and I do not therefore limit myself to the precise details shown and described, but claim as my invention all embodiments, variations and modifications coming within the scope of the subjoined claims.

I claim:

1. The method of generatively finishing helico-involute surfaces which comprises placing a blank having roughed out helical teeth in mesh with a rack-shaped tool, relatively reciprocating the blank and tool in the direction of the axis of blank while maintaining said axis in a given straight line, and simultaneously positively rotating said blank about its axis.

2. The method of generatively finishing helico-involute surfaces which comprises placing a blank having roughed out helical teeth in mesh with a rack-shaped tool having a plurality of teeth conjugate to the teeth of the gear to be produced, relatively reciprocating the blank and tool in the direction of the axis of the blank while maintaining said axis in a given straight line, simultaneously positively rotating said blank about its axis, and feeding the tool and blank toward each other.

3. The method of generatively finishing helico-involute surfaces which comprises placing a blank having roughed out helical teeth in mesh with a rack-shaped tool having a plurality of straight sided teeth, maintaining the axis of the blank in a given straight line, and relatively reciprocating the blank and tool along said axis while retaining them in mesh.

4. The method of generatively finishing helico-involute surfaces which comprises placing a blank having roughed out helical teeth in mesh with a rack-shaped tool having a plurality of straight sided teeth, maintaining the axis of the blank in a given straight line relatively reciprocating the blank and tool along said axis while retaining them in mesh, and feeding the tool and blank toward each other.

5. A machine for generatively finishing helico-involute gear teeth comprising a base, a carriage slidable upon said base, driving means for reciprocating said carriage upon the base, bearings upon the carriage, an arbor the axis of which is parallel to the motion of the carriage supported by the bearing and adapted to support a work gear, means positively rotating the arbor as the carriage is reciprocated, and a tool having a plurality of cutting edges lying in the surfaces of rack teeth conjugate to the gear being produced and carried by the base.

6. A machine for generatively finishing helico-involute gear teeth comprising a base, a carriage slidable upon said base, driving means for reciprocating said carriage upon the base, bearings upon the carriage, an arbor supported by the bearings and adapted to support a work gear, the axis of the arbor being parallel the movement of the carriage, and a tool having a plurality of cutting edges lying in the planes of rack teeth adapted to mesh with the gear being produced and carried by the base.

7. A machine for generatively finishing helico-involute gear teeth comprising a base, a carriage slidable upon said base, driving means for reciprocating said carriage upon the base, bearings upon the carriage, an arbor supported by the bearings and adapted to support a work gear with its axis extending in the direction of the reciprocation, and a lap having a plurality of cutting surfaces lying in the planes of rack teeth adapted to mesh with the gear being produced and carried by the base.

8. A machine for generatively finishing helico-involute gear teeth comprising a base, a carriage slidable upon said base, driving means for reciprocating said carriage upon the base, an arbor adapted to support a work gear with its axis extending in the direction of the reciprocation, a tool having a plurality of cutting edges lying in the planes of rack teeth adapted to mesh with the gear being produced, one of said two last mentioned elements carried by the base and the other by the carriage.

9. A machine for generatively finishing helico-involute gear teeth comprising an arbor adapted to receive a work gear, bearings in which said arbor is rotatably supported, a rack-shaped tool supported in position to be engaged by a gear upon the arbor, and means for reciprocating said bearings and arbor relative said tool in the direction of the axis of the arbor.

10. A machine for generatively finishing helico-involute gear teeth comprising a base, a carriage slidable upon said base, driving means reciprocating said carriage upon the base, bearings upon the carriage, an arbor supported by the bearings and adapted to support a work gear, a drum connected to the arbor, a cooperating member secured to the base, said drum and member being provided with inter-engaging lands and grooves arranged to positively rotate the arbor as the carriage is reciprocated, a tool having a plurality of cutting edges lying in the planes of rack teeth adapted to mesh with the gear being produced and carried by the base, and indexing means associated with said arbor.

11. A machine for generatively finishing helico-involute gear teeth comprising a base, a carriage slidable upon said base, driving means for reciprocating said carriage upon the base, bearings upon the carriage, an arbor supported by the bearings and adapted to support a work gear, inter-engaging means comprising a part connected to the arbor to rotate therewith and a part stationary with respect to the base arranged to positively rotate the arbor as the carriage is reciprocated, and a tool having a plurality of cutting edges lying in the planes of the rack teeth adapted to mesh with the gear being produced and carried by the base.

12. A machine for generatively finishing helico-involute gear teeth comprising an arbor adapted to receive a work gear, bearings in which said arbor is rotatably supported, a rack-shaped tool supported in position to be engaged by a gear upon the arbor, inter-engaging means one carried by the arbor and the other supported in stationary position relative the tool controlling the rotation of the arbor in said bearings, and means reciprocating said bearings and arbor relative said tool in the direction of the axis of the arbor.

CHARLES H. SCHURR.